US012770435B2

(12) United States Patent
Park et al.

(10) Patent No.: US 12,770,435 B2
(45) Date of Patent: Oct. 20, 2026

(54) GESTURE IDENTIFICATION APPARATUS AND GESTURE IDENTIFICATION METHOD THEREOF

(71) Applicant: HL Klemove Corp., Incheon (KR)

(72) Inventors: Jang-Woong Park, Incheon (KR); Jeong Kim, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 393 days.

(21) Appl. No.: 18/238,804

(22) Filed: Aug. 28, 2023

(65) Prior Publication Data

US 2024/0185639 A1 Jun. 6, 2024

(30) Foreign Application Priority Data

Dec. 2, 2022 (KR) ........................ 10-2022-0166917

(51) Int. Cl.
*B60W 50/08* (2020.01)
*G01S 7/41* (2006.01)
(Continued)

(52) U.S. Cl.
CPC .............. *G06V 40/28* (2022.01); *G01S 7/415* (2013.01); *G01S 13/867* (2013.01); *G06F 3/017* (2013.01);
(Continued)

(58) Field of Classification Search
CPC ........ G06V 40/28; G06V 10/25; G06V 10/44; G06V 20/59; G06V 20/597; G01S 7/415;
(Continued)

(56) References Cited

U.S. PATENT DOCUMENTS

2021/0089048 A1* 3/2021 Tran .................... B60R 16/0373
2021/0333869 A1* 10/2021 Cho ....................... B60K 35/10

FOREIGN PATENT DOCUMENTS

CN 217007681 U * 7/2022
KR 10-1556632 B1 10/2015
(Continued)

OTHER PUBLICATIONS

Office Action dated Dec. 1, 2025 for corresponding Korean Patent Application No. 10-2022-0166917, along with an English machine translation (20 pages).

*Primary Examiner* — Stephen R Koziol
*Assistant Examiner* — Dylan J Sherrillo
(74) *Attorney, Agent, or Firm* — Hauptman Ham, LLP

(57) ABSTRACT

Disclosed herein is an apparatus for identifying a movement. The apparatus including an indoor camera having a field of view inside a vehicle and obtain image data; an indoor radar having a sensing area inside the vehicle and obtaining radar data; a controller including a first processor and a second processor, the first processor obtaining location information of a region including a driver's hand based on processing gesture image data of the driver obtained from the indoor camera; and a second processor identifying the driver's gesture by processing the location information and gesture radar data of the driver obtained from the indoor radar. The first controller determining a region of interest (ROI), to which a driver's gaze is directed, among a plurality of predetermined control target regions inside the vehicle from the image data of the driver obtained from the indoor camera and transmitting a command corresponding to the identified gesture to a control target corresponding to the ROI.

20 Claims, 16 Drawing Sheets

(51) Int. Cl.

| | |
|---|---|
| ***G01S 13/86*** | (2006.01) |
| ***G06F 3/01*** | (2006.01) |
| ***G06T 7/73*** | (2017.01) |
| ***G06V 10/25*** | (2022.01) |
| ***G06V 10/44*** | (2022.01) |
| ***G06V 20/59*** | (2022.01) |
| ***G06V 40/20*** | (2022.01) |

(52) U.S. Cl.
CPC ................ *G06T 7/73* (2017.01); *G06V 10/25* (2022.01); *G06V 10/44* (2022.01); *G06V 20/59* (2022.01); *G06T 2207/30196* (2013.01); *G06T 2207/30268* (2013.01)

(58) Field of Classification Search
CPC ......... G01S 13/867; G06F 3/017; G06T 7/73; G06T 2207/30196; G06T 2207/30268; B60W 50/08; B60W 40/08; B60W 2050/0044; B60W 2050/0057; B60W 2050/143; B60W 2420/403; B60W 2420/408; B60W 2540/225
See application file for complete search history.

(56) References Cited

FOREIGN PATENT DOCUMENTS

| | | | | | | |
|---|---|---|---|---|---|---|
| KR | 10-2017-0024904 | A | | 3/2017 | | |
| KR | 20190095613 | A | * | 8/2019 | ............. | G01S 7/032 |
| KR | 10-2021-0001219 | A | | 1/2021 | | |
| KR | 10-2021-0073292 | A | | 6/2021 | | |
| KR | 10-2022-0044809 | A | | 4/2022 | | |

* cited by examiner

GESTURE IDENTIFICATION APPARATUS AND GESTURE IDENTIFICATION METHOD THEREOF

CROSS-REFERENCE TO RELATED APPLICATION

This application claims the benefit of Korean Patent Application No. 10-2022-0166917, filed on Dec. 2, 2022 in the Korean Intellectual Property Office, the disclosure of which is incorporated herein by reference.

TECHNICAL FIELD

Embodiments of the present disclosure relate to an apparatus for identifying a gesture of a driver of a vehicle and performing a corresponding function and a controlling method thereof.

BACKGROUND

In modern society, vehicles provide various functions. These vehicles require suitable interfaces to utilize the various functions, but providing an appropriate interface input while driving is not easy and has an adverse effect on safety.

Most of the existing vehicles adopt touchscreen-based contact control for infotainment and air-conditioning systems. However, operating an infotainment system or a climate control device while driving may distract a driver's forward attention, which may result in an accident. Furthermore, from the perspective of user convenience, it is inconvenient for a driver to stretch his arm at least a certain distance to use a touch-type infotainment system while driving.

To solve this problem, there is a technology that performs infotainment control for a specific motion by identifying a hand movement based on an indoor camera, but a deep learning algorithm is needed to process images and identify hand movements, which also requires high-performance hardware. In addition, the performance of identifying hand movements may be degraded in an environment of strong sunlight or lighting that includes infrared wavelengths.

SUMMARY

Therefore, it is an aspect of the present disclosure to provide an apparatus for controlling a control target according to an identified gesture by identifying the gesture including a hand movement through an indoor camera and an indoor radar and tracking a driver's gaze through the indoor camera to identify a target that a driver wants to control, and a controlling method thereof.

Additional aspects of the disclosure will be set forth in part in the description which follows and, in part, will be obvious from the description, or may be learned by practice of the disclosure.

In accordance with one aspect of the present disclosure, an apparatus includes: an indoor camera configured to have a field of view inside a vehicle and obtain image data; an indoor radar configured to have a sensing area inside the vehicle and obtain radar data; a controller including a first processor and a second processor, the first processor configured to obtain location information of a region including a driver's hand based on processing gesture image data of the driver obtained from the indoor camera; and a second processor configured to identify the driver's gesture by processing the location information and gesture radar data of the driver obtained from the indoor radar. The first controller determines a region of interest (ROI), to which a driver's gaze is directed, among a plurality of predetermined control target regions inside the vehicle from the image data of the driver obtained from the indoor camera, and transmits a command corresponding to the identified gesture to a control target corresponding to the ROI.

The controller may extract a feature vector including information on a distance, a velocity, and an angle of arrival of the gesture based on performing digital signal processing on the location information and the gesture radar data.

The controller may convert the location information to location information of a μ-v coordinate system.

The controller may calculate an azimuth-elevation steering matrix based on the converted location information.

The controller may perform a fast Fourier transform (FFT) on the gesture radar data and calculate a spatial covariance matrix based on the data on which the FFT is performed.

The controller may calculate a minimum variance distortionless response (MVDR) angle spectrum based on the spatial covariance matrix and the azimuth-elevation steering matrix.

The controller may extract a feature vector including information on the distance, the velocity, and the angle of arrival of the gesture based on performing a constant false alarm rate (CFAR) on the calculated MVDR angle spectrum.

The controller may determine a control target corresponding to the ROI and transmit the command corresponding to the identified gesture to the determined control target.

Based on identifying a command, which matches the command corresponding to the identified gesture, among pre-stored commands for the determined control target corresponding to the ROI, the first controller may transmit the matched command to the control target.

Based on failing to identify a command, which matches the command corresponding to the identified gesture, among pre-stored commands for the determined control target corresponding to the ROI, the first controller may notify the driver that the gesture is unidentifiable.

In accordance with one aspect of the present disclosure, a method includes: obtaining, by an indoor camera, gesture image data of a driver; obtaining, by an indoor radar, gesture radar data of the driver; obtaining, by at least one processor, location information of a region including a driver's hand by processing the gesture image data; identifying, by the at least one processor, a driver's gesture by processing the location information and the gesture radar data; determining, by the at least one processor, an ROI, to which a driver's gaze is directed, among a plurality of predetermined control target regions inside a vehicle from the image data of the driver obtained from the indoor camera; and transmitting, by at least one the processor, a command corresponding to the identified gesture to a control target corresponding to the ROI.

The identifying of the gesture of the driver may include extracting a feature vector including information on a distance, a velocity, and an angle of arrival of the gesture based on performing digital signal processing on the location information and the gesture radar data.

The extracting of the feature vector may include converting the location information to location information of a μ-v coordinate system.

The extracting of the feature vector may include calculating an azimuth-elevation steering matrix based on the converted location information.

The extracting of the feature vector may include: performing a fast Fourier transform (FFT) on the gesture radar data; and calculating a spatial covariance matrix based on the data on which the FFT is performed.

The extracting of the feature vector may include calculating a minimum variance distortionless response (MVDR) angle spectrum based on the spatial covariance matrix and the azimuth-elevation steering matrix.

The extracting of the feature vector may include extracting a feature vector including the information on the distance, the velocity, and the angle of arrival of the gesture based on performing a constant false alarm rate (CFAR) on the calculated MVDR angle spectrum.

The method may further include determining a control target corresponding a ROI when the ROI is determined.

The transmitting to the control target may include transmitting a matched command to the control target based on identifying the matched command, which matches the command corresponding to the identified gesture, among pre-stored commands for the determined control target corresponding to the ROI.

The method may further include notifying the driver that the gesture is unidentifiable, based on failing to identify a command, which matches the command corresponding to the identified gesture, among pre-stored commands for the determined control target corresponding to the ROI.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
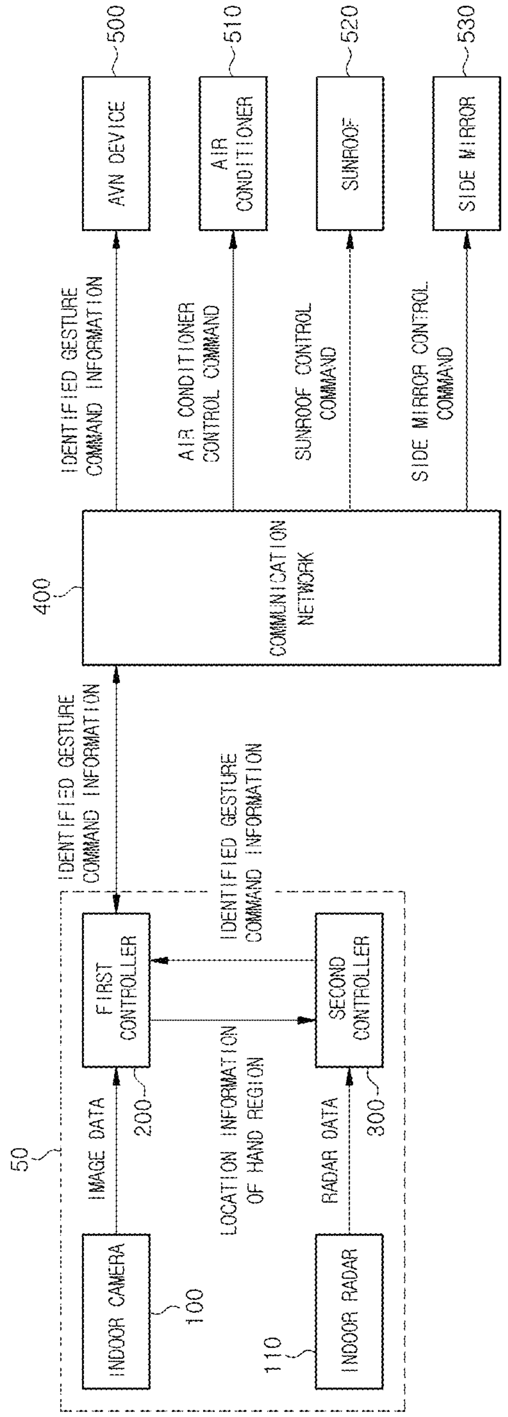
FIG. 1 illustrates a movement identification device in accordance with one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
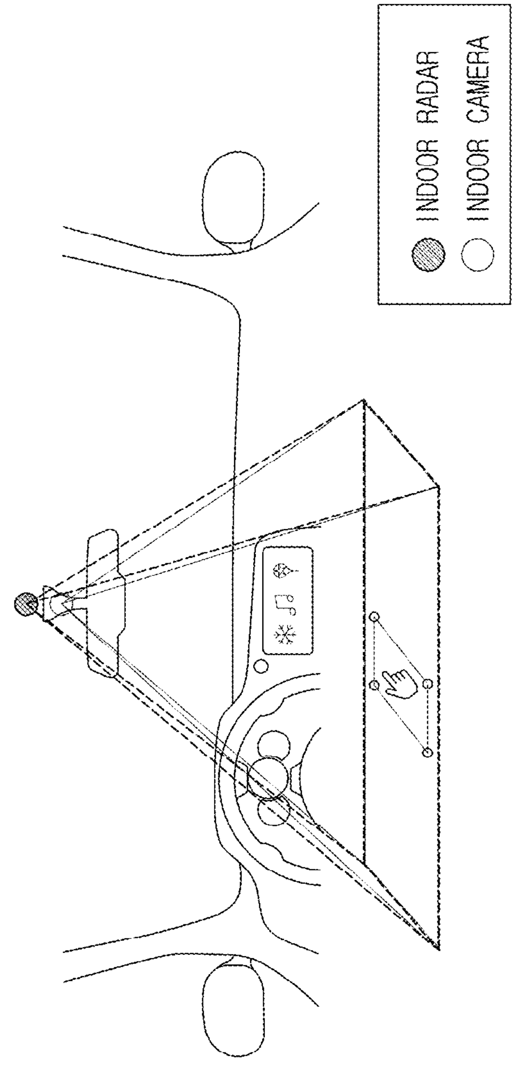
FIG. 2 illustrates that an indoor camera and an indoor radar identify a hand of a driver in accordance with one embodiment.
Figure 3:
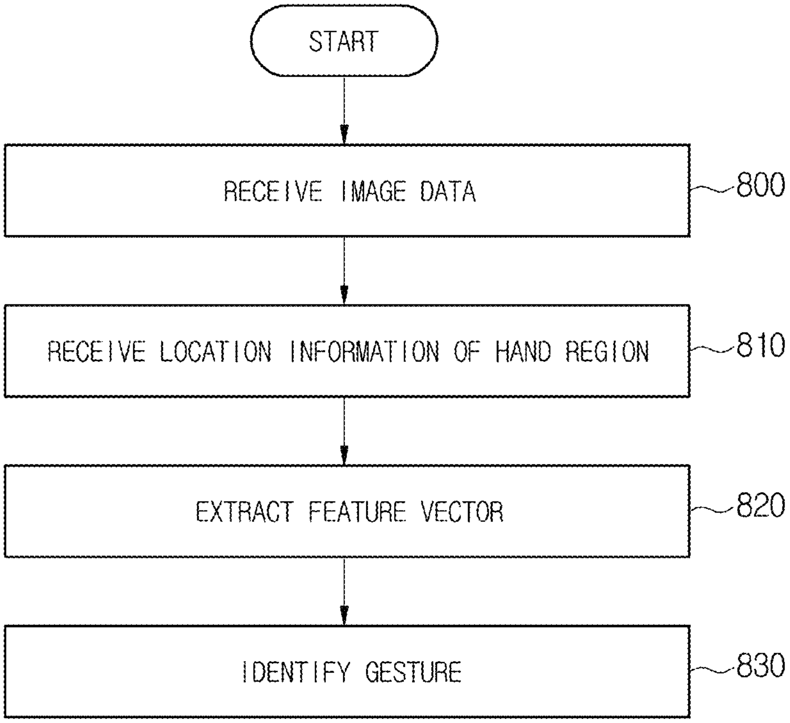
FIGS. 3 and 4 illustrate a method of identifying a movement in accordance with one embodiment.
Figure 4:
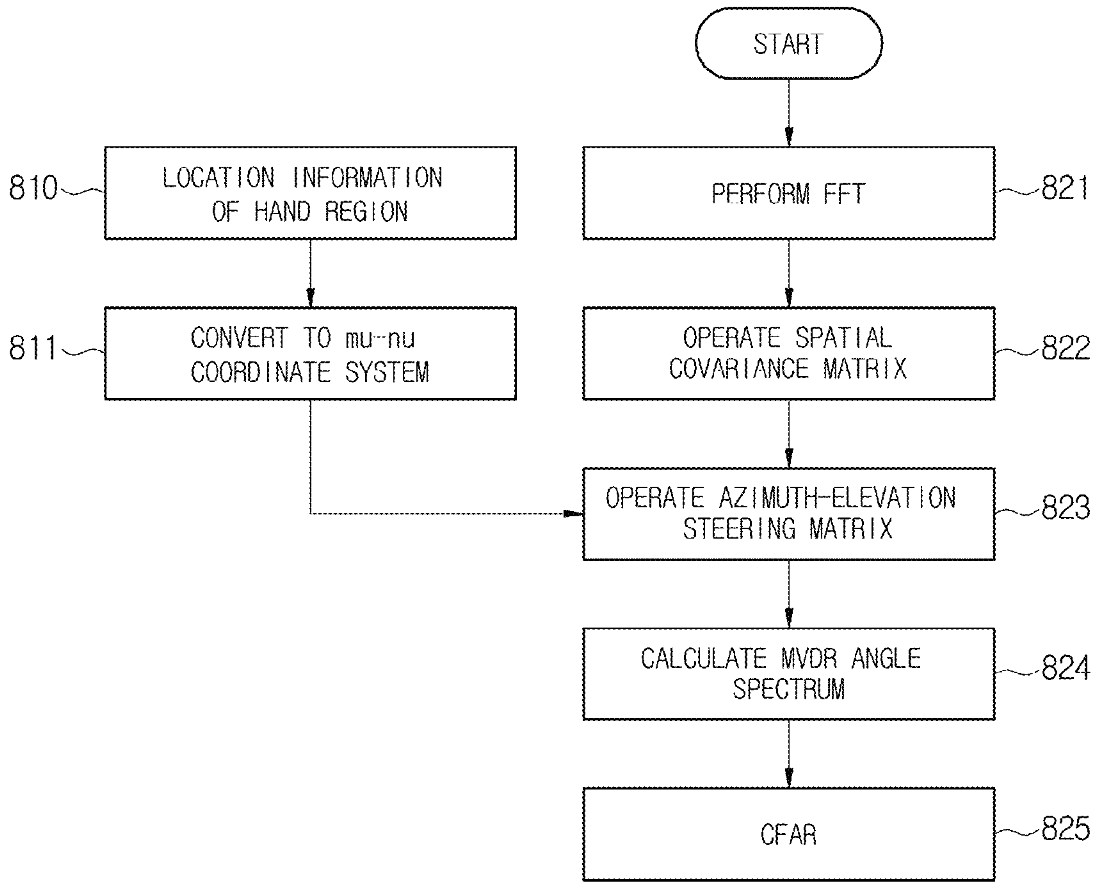
Figure 5:
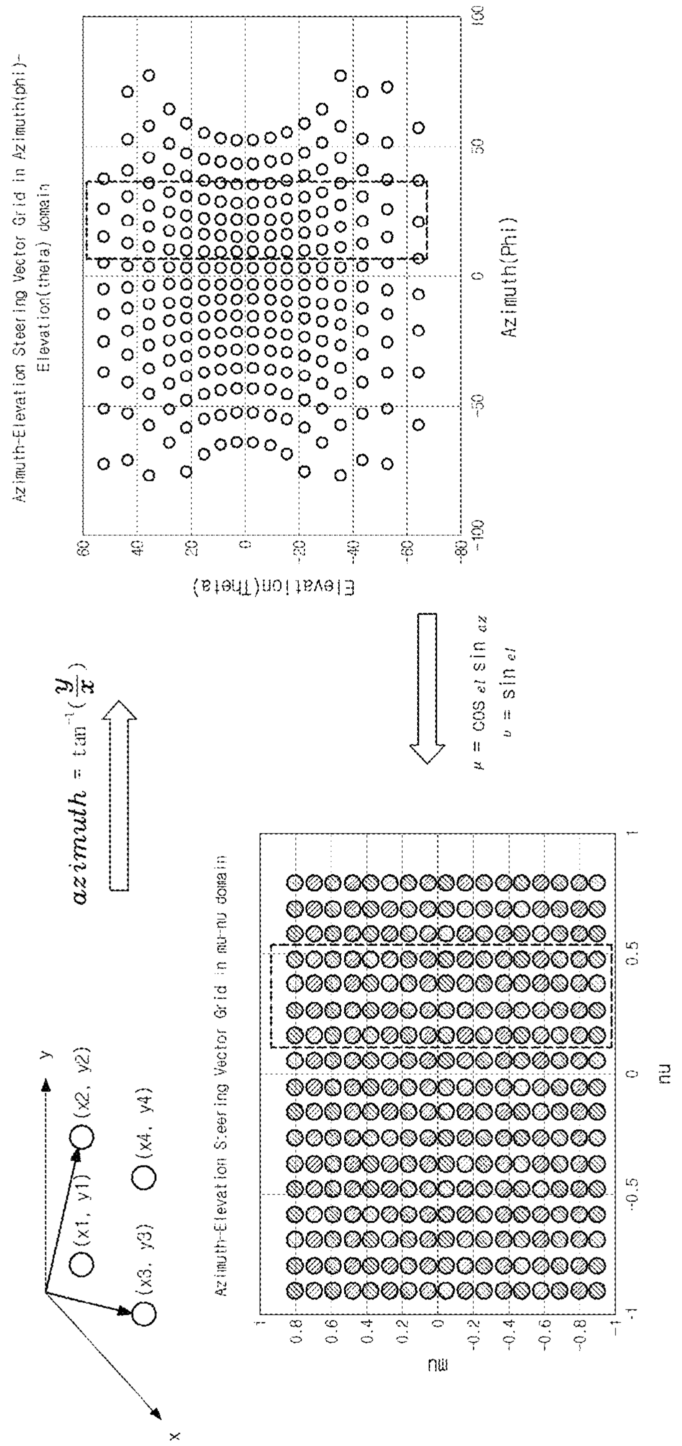
FIG. 5 illustrates that location information of a hand region is converted into a μ-v coordinate system in accordance with one embodiment.
Figure 6:
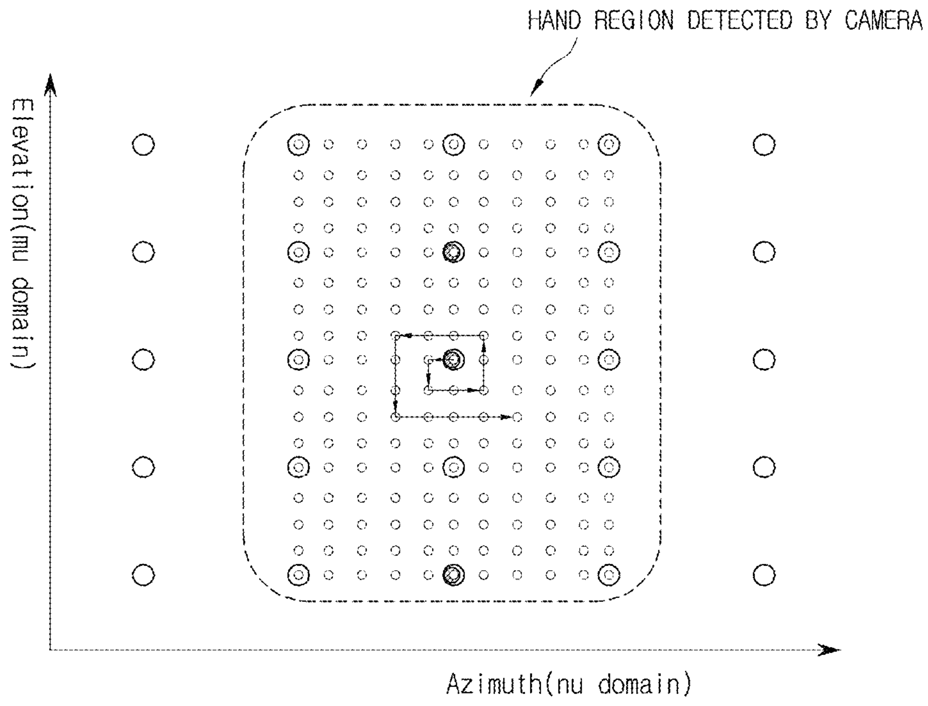
FIG. 6 illustrates an azimuth-elevation steering matrix operation in accordance with one embodiment.

FIG. 1 illustrates a movement identification device in accordance with one embodiment. FIG. 2 illustrates that an indoor camera and an indoor radar identify a hand of a driver. FIGS. 3 and 4 illustrate a method of identifying a movement in accordance with one embodiment. FIG. 5 illustrates that location information of a hand region is converted into a μ-v coordinate system. FIG. 6 illustrates an azimuth-elevation steering matrix operation.

As illustrated in FIG. 1, a vehicle may include a movement identification device 50 including an indoor camera 100, an indoor radar 110, a first controller 200, and a second controller 300, a communication network 400, an audio video navigation (AVN) device 500, an air conditioner 510, a sunroof 520, and a side mirror 530. The AVN device 500, the air conditioner 510, the sunroof 520, and the side mirror 530 may receive a control command corresponding to a gesture identified by the movement identification device 50 and operate according to the received control command. The AVN device 500, the air conditioner 510, the sunroof 520, and the side mirror 530 are merely examples, and targets to be controlled by a driver's gesture are not limited thereto.

The movement identification device 50 and the AVN device 500, the air conditioner 510, the sunroof 520, and the side mirror 530 may communicate with each other through the vehicle communication network 400. For example, the movement identification device 50 and the AVN device 500, the air conditioner 510, the sunroof 520, and the side mirror 530 may send and receive data via Ethernet, MOST (Media Oriented Systems Transport), Flexray, CAN (Controller Area Network), LIN (Local Interconnect Network), and the like.

The movement identification device 50 may include the indoor camera 100, the indoor radar 110, the first controller 200, and the second controller 300. The first controller 200 may be an indoor camera controller, and the second controller 300 may be a radar controller.

The indoor camera 100, the indoor radar 110, the first controller 200, and the second controller 300 may be provided separately from each other. For example, the first controller 200 may be installed in a housing that is separate from a housing of the indoor camera 100. The second controller 300 may be installed in a housing that is separate from a housing of the indoor radar 110. The first controller 200 and the second controller 300 may send and receive data to and from the indoor camera 100 or the indoor radar 110 via a broadband network. The first controller 200 and the second controller 300 may send and receive data to and from the indoor camera 100 or the indoor radar 110 via a wired and/or wireless network.

In addition, at least a part of the indoor camera 100, the indoor radar 110, the first controller 200, and the second controller 300 may be provided as one unit. For example, the indoor camera 100 and the first controller 200 may be provided in one housing, or the indoor radar 110 and the second controller 300 may be provided in one housing. In some embodiments, the indoor camera 100 and the first controller 200 may be provided in one housing and the indoor radar 110 and the second controller 300 may be provided in another housing. In some embodiments, the indoor camera 100, the first controller 200, the indoor radar 110 and the second controller 300 may be provided in one housing.

The indoor camera 100 may capture an interior of a vehicle and obtain image data of a driver. For example, as illustrated in FIG. 2, the indoor camera 100 may be installed in a rear view mirror or installed inside a front windshield, and may have a field of view directed to the interior of the vehicle.

The indoor camera 100 may include a plurality of lenses and an image sensor. The image sensor may include a plurality of photodiodes that convert light into an electric signal, and the plurality of photodiodes may be placed in a two-dimensional matrix. The Image data may include information on a driver's gaze (e.g., the direction of the driver's eyes or the driver's focus) or a driver's hand movement inside the vehicle and a location of the driver's hand. While a right hand is depicted throughout the figures and described in the disclosure, it can be appreciated that a left hand, left arm, right arm, or any other feature movable by the driver may be used.

The movement identification device 50 may include an image processor for processing image data of the indoor camera 100, and the image processor may be integrally provided with, for example, the indoor camera 100 or the first controller 200.

The image processor may obtain image data from the image sensor of the indoor camera 100 and obtain location information of a virtual region including the driver's hand, as illustrated in FIG. 2, based on processing the image data. The image processor may deliver the location information of the region including the driver's hand to the first controller 200.

The indoor radar 110 may send a transmission radio wave into the vehicle and obtain gesture radar data including information on the driver's gesture inside the vehicle based on a reflected radio wave reflected from the driver. For example, as illustrated in FIG. 2, the indoor radar 110 may be installed in the rear view mirror or installed inside the front windshield, and may have a sensing area directed to the interior of the vehicle.

The indoor radar 110 may include a transmission antenna (or transmission antenna array) emitting a transmission radio wave into the vehicle and a reception antenna (or reception antenna array) receiving a reflected radio wave reflected from an object.

The indoor radar 110 may obtain radar data from the transmission radio wave transmitted by the transmission antenna and the reflected radio wave received by the reception antenna. The radar data may include location information (for example, distance information) and/or speed information of a hand which is a main subject of the driver's gesture inside the vehicle.

The movement identification device 50 may include a signal processor for processing radar data of the indoor radar 110, and the signal processor may be integrally provided with, for example, the indoor radar 110 or the second controller 300.

The signal processor may obtain radar data from the reception antenna of the indoor radar 110 and create data about a movement of an object by clustering reflection points of reflected signals. For example, the signal processor may obtain a distance to the object based on a time difference between a transmission time of a transmission radio wave and a reception time of a reflected radio wave and obtain a velocity of the object based on a difference between a frequency of the transmission radio wave and a frequency of the reflected radio wave.

The signal processor may deliver data about the driver's hand movements inside the vehicle obtained from the radar data to the second controller 300.

The first controller 200 may be electrically connected with the indoor camera 100, and the second controller 300 may be electrically connected with the indoor radar 110. In addition, the first controller 200 or the second controller 300 may be connected with the AVN device 500, the air conditioner 510, the sunroof 520, the side mirror 530, and the like via a vehicle communication network.

The first controller 200 may process image data of the indoor camera 100, and the second controller 300 may process radar data of the indoor radar 110 and provide a control command to the AVN device 500, the air conditioner 510, the sunroof 520, and the side mirror 530.

Each of the first controller 200 and the second controller 300 may include a processor and a memory.

The memory may store a program and/or data for processing image data and radar data. In addition, the memory may store a control command for controlling the AVN device 500, the air conditioner 510, the sunroof 520, the side mirror 530, and the like.

The memory may temporarily memorize the image data received from the indoor camera 100 and the radar data received from the indoor radar 110, and temporarily memorize a processing result of the processor for the image data and the radar data.

The memory may include not only a volatile memory such as an S-RAM and a D-RAM but also a non-volatile memory such as a flash memory, a read only memory (ROM), and an erasable programmable read only memory (EPROM).

The processor may process the image data of the indoor camera 100 and the radar data of the indoor radar 110. For example, the processor may fuse the image data and the radar data and output fused data. The processor may have an associated non-transitory memory storing software instructions which, when executed by the processor, provides the functionalities of creating a control command for controlling the AVN device 500, the air conditioner 510, the sunroof 520, and the side mirror 530 based on processing the fused data. The processor may take the form of one or more processor(s) and associated memory storing program instructions, and in some examples the one or more processor(s) may be used to implement the functions of both the first controller 200 and the second controller 300 and the processor associated with each.

The processor may create a control command for controlling the AVN device 500, the air conditioner 510, the sunroof 520, and the side mirror 530 based on processing the fused data. For example, the processor may identify the driver's gesture by processing the image data and the radar data of the driver's hand obtained from the indoor camera 100 and the indoor radar 110, and create a control command for controlling the AVN device 500, the air conditioner 510, the sunroof 520, and the side mirror 530 accordingly.

The processor may include an image processor for processing the image data of the indoor camera 100, a signal processor for processing the radar data of the indoor radar 110, or a micro control unit (MCU) for creating a control command for a control target.

As described above, the first controller 200 and the second controller 300 may provide a control command for controlling the AVN device 500, the air conditioner 510, the sunroof 520, and the side mirror 530 based on the image data of the indoor camera 100 and the radar data of the indoor radar 110.

A concrete operation of the movement identification device 50 will be described in further detail below.

Referring to FIG. 3, the first controller 200 receives gesture image data about a driver's gesture obtained from the indoor camera 100 (800). The first controller 200 extracts location information of a region including the driver's hand, which is included in the gesture image data, and transmits the location information to the second controller 300 (810).

During the process of extracting the location information of the hand region, a coordinate system used by the first controller 200 and a coordinate system used by the second controller 300 may be set to a coordinate system with the same size. As illustrated in FIG. 2, the first controller 200 first identifies the driver's hand in the gesture image data obtained from the indoor camera 100 and then makes a rectangular virtual region around the hand region. Information on the virtual region may consist of X and Y coordinate values of each vertex and may be transmitted to the second controller 300. As the indoor camera 100 used in extracting the location information of the hand region is incapable of extracting depth information, only X and Y coordinate values may be transmitted to the second controller 300.

When receiving the location information of the hand region from the first controller 200, the second controller 300 converts the location information to the u-v coordinate system (811). Since the location information of the hand region obtained from the first controller 200 is based on the Cartesian coordinate system, the location information may be converted to the μ-v coordinate system to be used for the Azimuth-Elevation Steering Matrix operation.

Referring to FIG. 5, the second controller 300 may select a vertex forming the smallest angle from an x axis and a vertex forming the largest angle from the x axis among four vertexes of a virtual region that is identified as a hand region and convert the two vertexes to the μ-v coordinate system. The second controller 300 may first convert x and y coordinate values to an azimuth angle and then obtain a nu value based on the azimuth angle. The second controller 300 may set every elevation angle to an angle of interest (region of red broken line) within an azimuth angle range converted for the two vertexes in a preset azimuth-elevation steering vector grid.

The second controller 300 extracts a feature vector including information on the driver's hand gesture by using the location information of the hand region and the gesture radar data that are received from the first controller 200 (820).

The second controller 300 is a 60 GHz FMCW modulation type radar controller. The second controller 300 may extract a feature vector including information on a distance, a velocity, and an angle of arrival by performing digital signal processing (FFT+MVDR+CFAR) on the hand region obtained from the above-described process.

The second controller 300 performs FFT on a digital sample delivered from ADC of the indoor radar 110 (821). The fast Fourier transform (FFT) is used to analyze a signal in the frequency domain. The second controller 300 calculates a spatial covariance matrix used in a Capon beamforming algorithm based on FFT-processed data (822).

As shown in Equation 1 below, a covariance matrix Rx is a covariance matrix of a received signal X(t), and after the range FFT processing in the signal processing operation, the covariance matrix may be calculated for each range in a radar cube.

$$R_x = \frac{1}{N_c}\sum_{c=0}^{N_c-1} X_c X_C^H,\ X_c = \left[x_{(c0)}, x_{(c,1)}, \ldots, x_{(c,N_r-1)}\right]^T, \qquad \text{Equation 1}$$

$$N_c = num \text{ of chirps},\ N_r = num \text{ of virtural antennas}$$

The second controller 300 performs an azimuth-elevation steering matrix operation based on the information on the hand region that is converted to the u-v coordinate system (823). Referring to FIG. 6, the second controller 300 may find a center of the hand region detected by the indoor camera 100 and operate an azimuth-elevation steering matrix obtained by subdividing a preset azimuth-elevation steering grid in a counterclockwise direction from the center. Since the center has more meaningful hand movement information than a region boundary, the second controller 300 may start the azimuth-elevation steering matrix operation at the center. In FIG. 5, a grid marked in a blue circle may correspond to a preset azimuth-elevation steering vector grid according to a sensor FoV, and a grid marked in a yellow circle may correspond to an azimuth-elevation steering vector grid obtained by subdividing the preset azimuth-elevation steering vector grid for delicate sensing of a hand movement.

The second controller 300 calculates an MVDR angle spectrum based on the spatial covariance matrix and the azimuth-elevation steering matrix that are operated in the above-described process (824). A minimum variance distortionless response (MVDR) is an algorithm that increases an SNR while minimizing output power of an array by maintaining a certain gain for a signal incident in a predetermined direction and giving a small weight (nulling) to a signal in another direction.

The second controller 300 finally extracts a feature vector by performing a constant false alarm rate (CFAR) (825). The feature vector may contain information on a distance, a velocity, and an angle of arrival. Generally, in most signals received by the indoor radar 110, a noise signal occupies a larger region than a target signal in time-space domain. Accordingly, a target detection typically sets a threshold and determines a signal above the threshold as a target. However, in a real situation, since the signal intensity of noise changes over time, setting a constant threshold increases the probability of mistakenly targeting a signal that is not a target. Accordingly, a CFAR algorithm may be used which sets a threshold value according to an ambient noise signal.

The second controller 300 may identify a gesture indicated by a specific hand movement by using the extracted feature vector as an input signal of a machine learning model (830).

Thus, the second controller 300 may identify a gesture indicated by the driver's hand movement by using data of the indoor camera 100 and the indoor radar 110, determine a command indicated by the identified gesture, and transmit the determined command to the first controller 200.

The first controller 200 may track the driver's gaze, transmit the control command received from the second controller 300 to a control target at the location to which the driver's gaze is directed, and thus control the control target according to the driver's gesture. Hereinafter, the operation will be described in detail.

Figure 7:
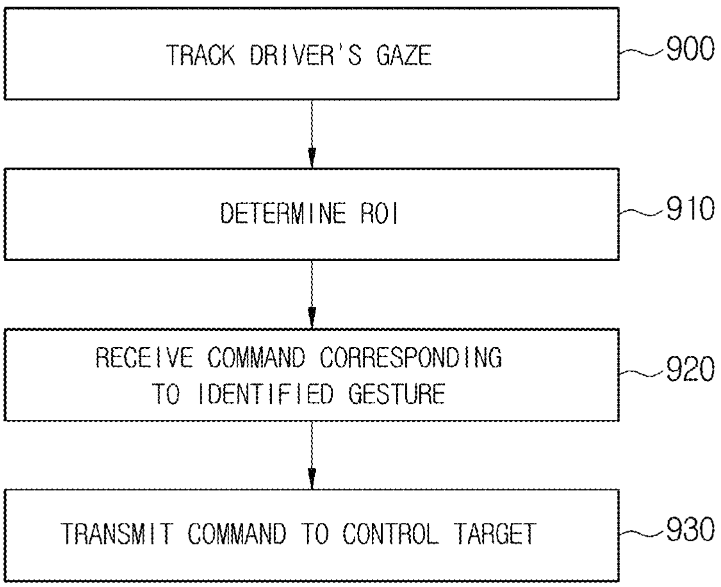
FIG. 7 illustrates that a command corresponding to an identified gesture is transmitted to a control target in accordance with one embodiment.

FIG. 7 illustrates that a command corresponding to an identified gesture is transmitted to a control target in accordance with one embodiment. FIGS. 8 to 16 illustrate a plurality of control target ROIs.

Referring to FIG. 7, the first controller 200 tracks the driver's gaze based on image data related to a movement of the driver's gaze received from the indoor camera 100 (900). The first controller 200 determines a region to which the driver's gaze is directed, that is, a region of interest (ROI) 126 among preset control target regions 125 based on tracking information of the driver's gaze (910).

Figure 8:
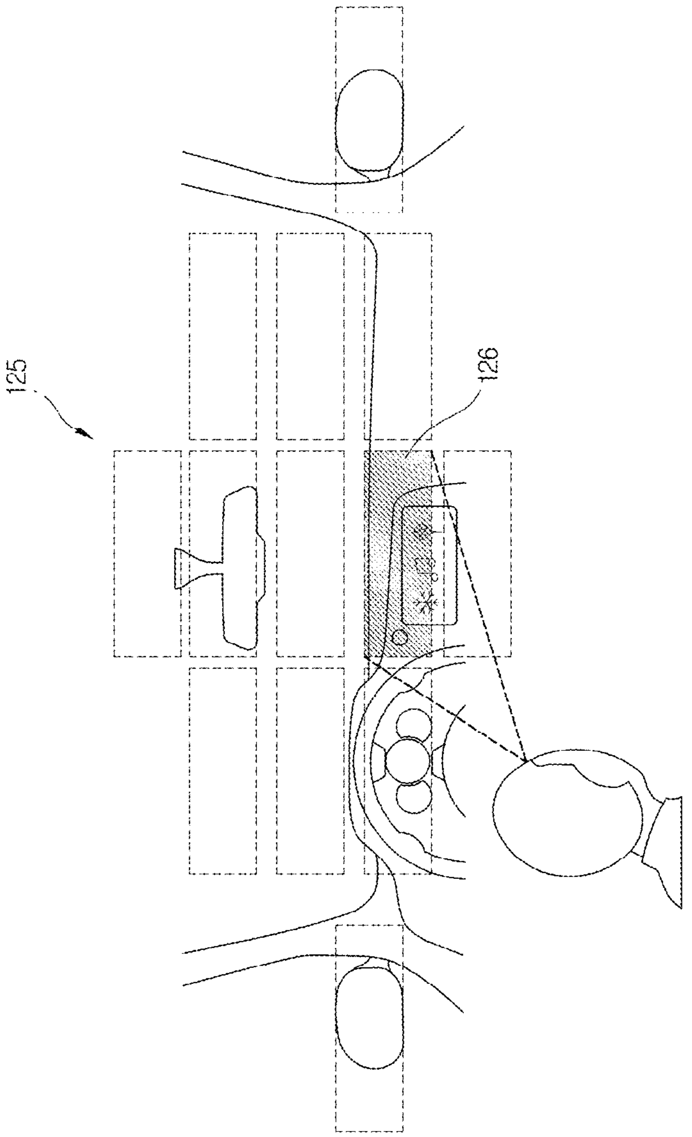
FIGS. 8-16 illustrate a plurality of control target ROIs.

Referring to FIG. 8, among the thirteen preset control target regions 125, the ROI 126, to which the driver's gaze is directed, may be determined in the first controller 200. Each of the preset control target regions 125 may be given a unique ID which can be distinguished from each other.

In some embodiments, there may be between five and fifteen preset control target regions 125. In some embodiments, there may be up to five preset control target regions 125. In some embodiments, there may be up to seven preset control target regions 125. In some embodiments, there may be up to nine preset control target regions 125. In some embodiments, there may be up to eleven preset control target regions 125. In some embodiments, there may be up to thirteen preset control target regions 125. In some embodiments, there may be up to fifteen preset control target regions 125. In some embodiments, there may be up to seventeen preset control target regions 125. In some embodiments, there may be up to nineteen preset control target regions 125. In some embodiments, there may be up to twenty preset control target regions 125.

The first controller 200 receives a command corresponding to the identified gesture from the second controller 300 (920) and transmits the received command to a control target corresponding to the ROI 126 (930).

The first controller 200 may store control commands, which can be transmitted to the control target, for example, the AVN device 500, the air conditioner 510, the sunroof 520, or the side mirror 530, according to each control target in a non-volatile memory in advance. If a command received from the second controller 300 matches a command that is stored in advance for a control target corresponding to the ROI 126, the first controller 200 may transmit the control command to the control target via a communication network. However, if the command received from the second controller 300 does not match the command that is stored in advance for the control target corresponding to the ROI 126, the first controller 200 notifies the driver that the command is not identifiable in voice or text through a cluster or the AVN device 500.

Figure 9:
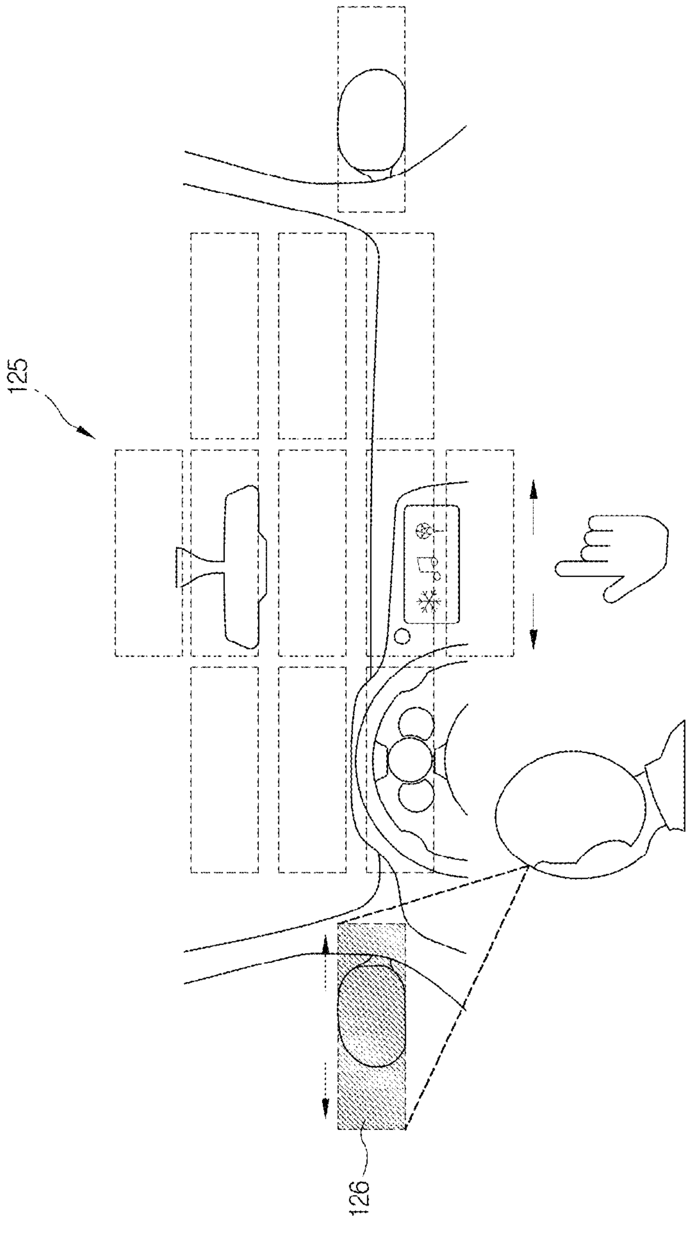

Referring to FIG. 9, among the control target regions 125, the control target corresponding to the ROI 126 to which the driver's gaze is directed may be the side mirror 530, and the side mirror 530 may be controlled according to a command corresponding to the identified gesture.

Figure 10:
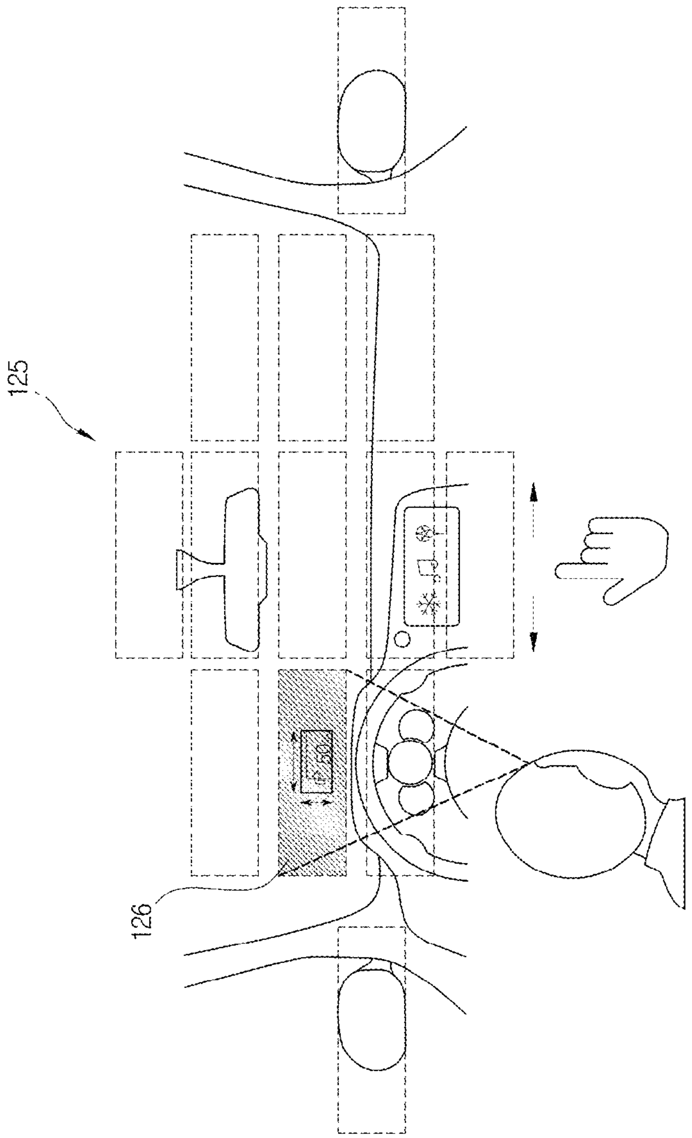

Referring to FIG. 10, among the control target regions 125, the control target corresponding to the ROI 126 to which the driver's gaze is directed may be a head-up display, and the head-up display may be controlled according to a command corresponding to the identified gesture.

Figure 11:
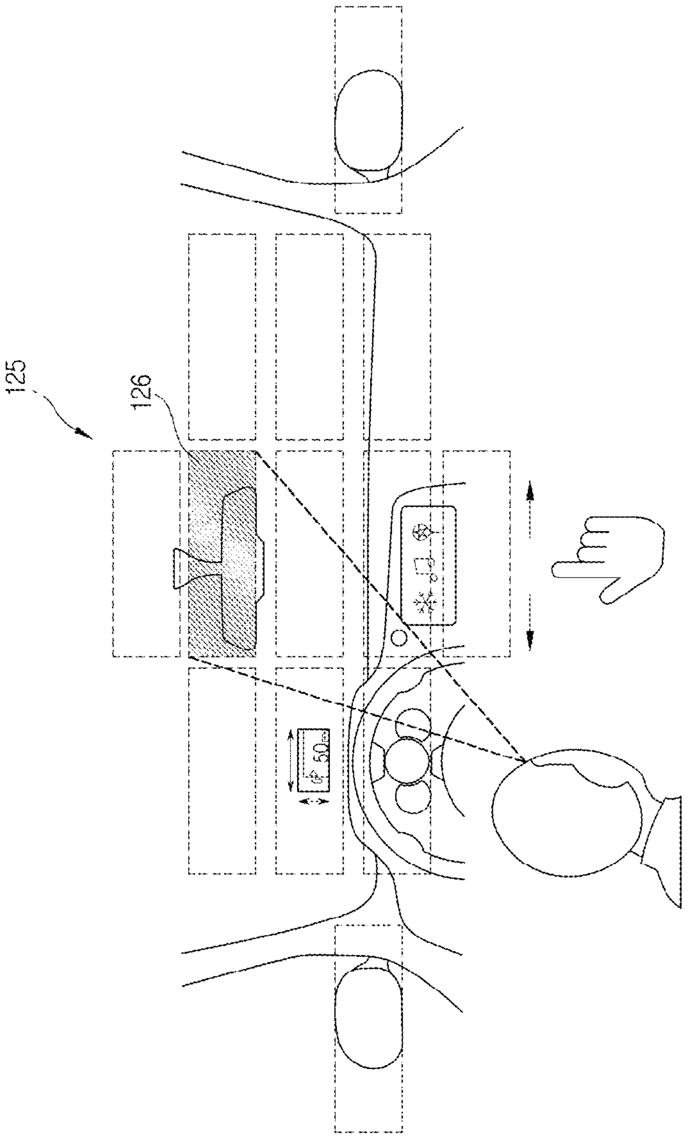

Referring to FIG. 11, among the control target regions 125, the control target corresponding to the ROI 126 to which the driver's gaze is directed may be a rear view mirror, and the rear view mirror may be controlled according to a command corresponding to the identified gesture.

Figure 12:
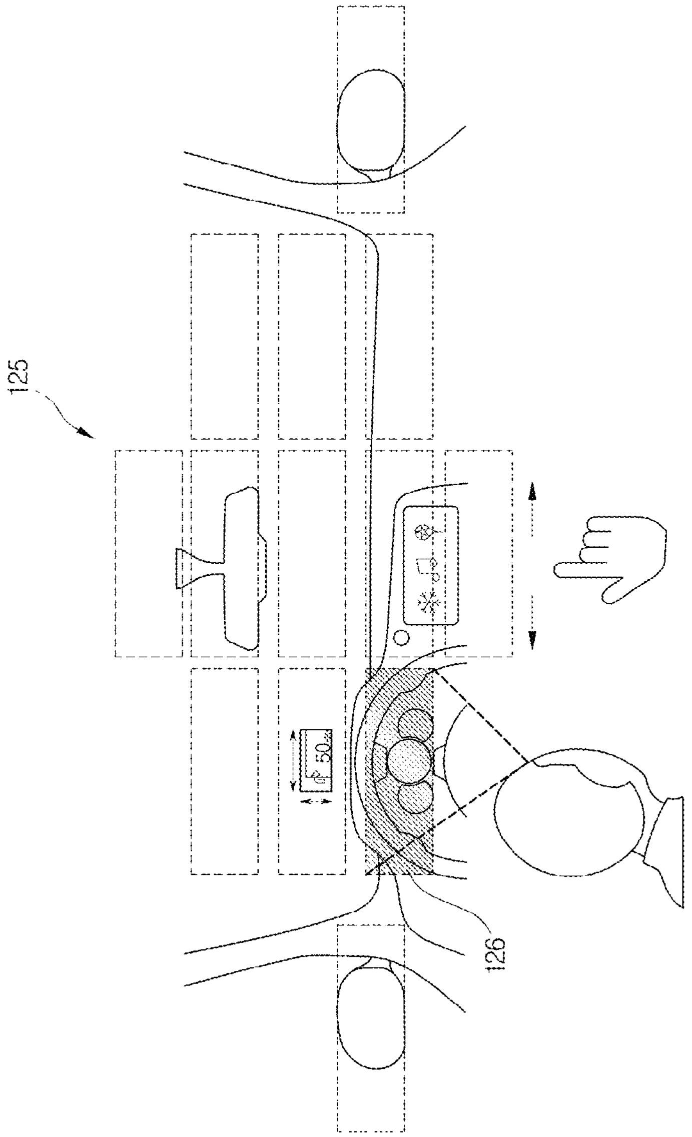

Referring to FIG. 12, among the control target regions 125, the control target corresponding to the ROI 126 to which the driver's gaze is directed may be a cluster, and the cluster may be controlled according to a command corresponding to the identified gesture.

Figure 13:
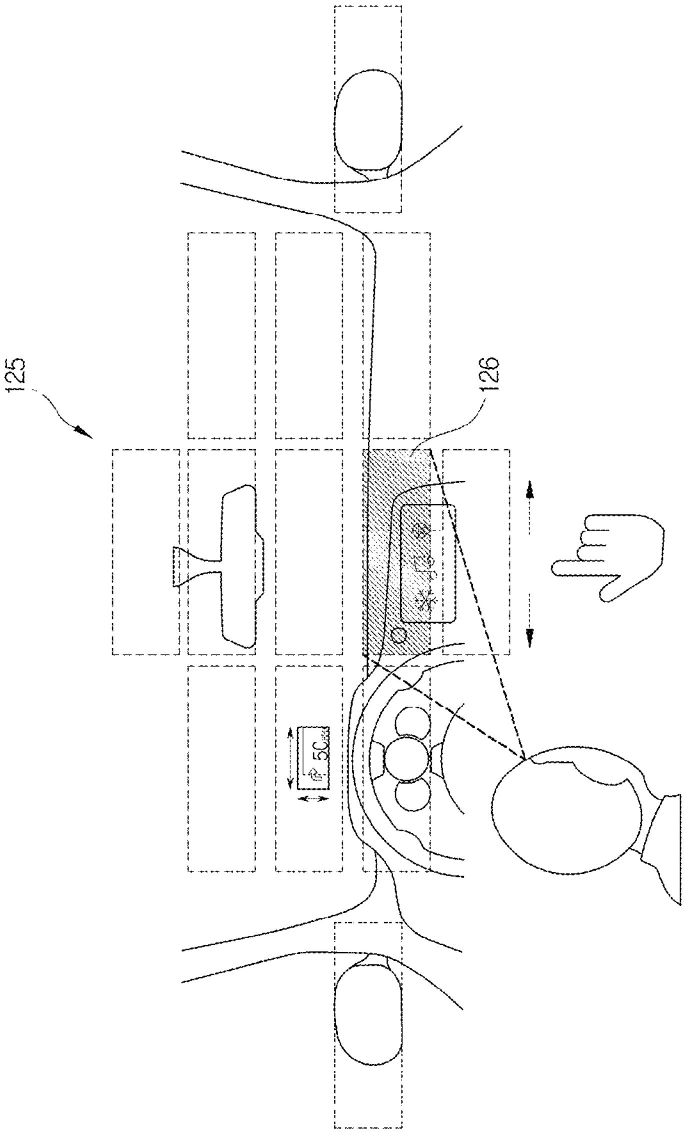

Referring to FIG. 13, among the control target regions 125, the control target corresponding to the ROI 126 to which the driver's gaze is directed may be the AVN device 500, and the AVN device 500 may be controlled according to a command corresponding to the identified gesture.

Figure 14:
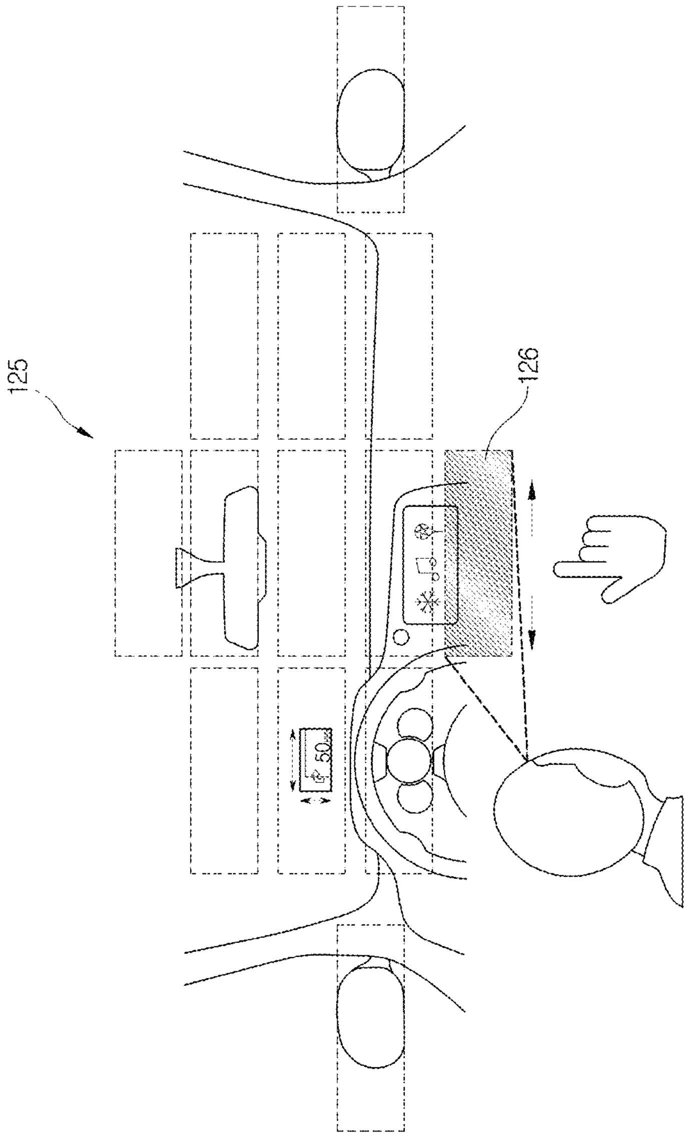

Referring to FIG. 14, among the control target regions 125, the control target corresponding to the ROI 126 to which the driver's gaze is directed may be the air conditioner 510, and the air conditioner 510 may be controlled according to a command corresponding to the identified gesture.

Figure 15:
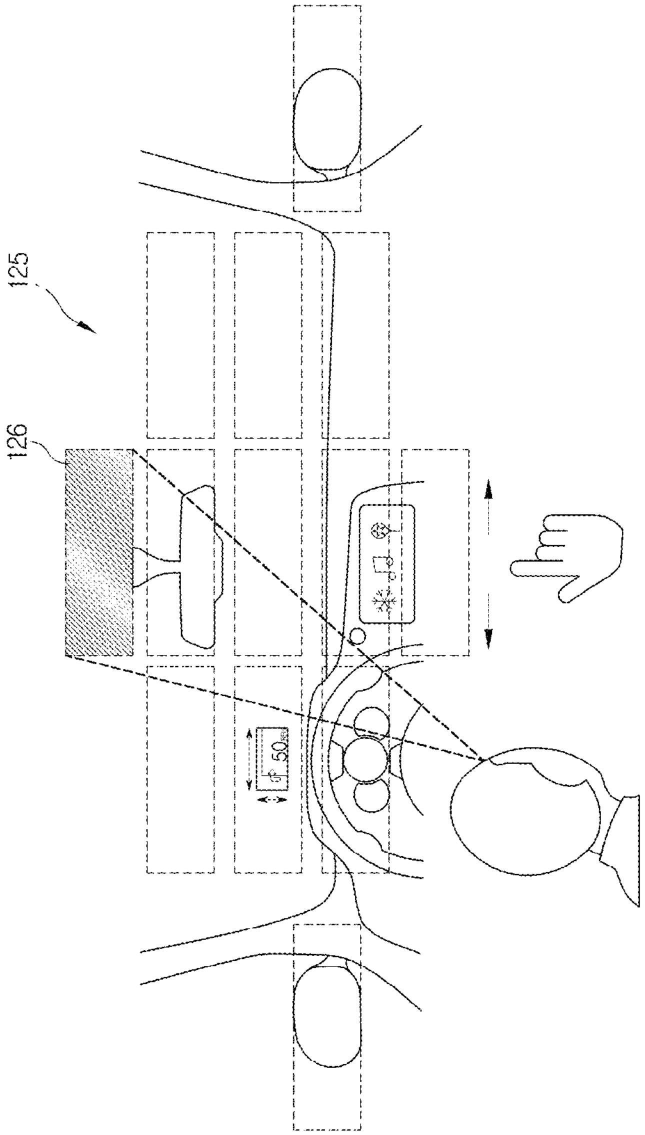

Referring to FIG. 15, among the control target regions 125, the control target corresponding to the ROI 126 to which the driver's gaze is directed may be the sunroof 520, and the sunroof 520 may be controlled according to a command corresponding to the identified gesture.

Figure 16:
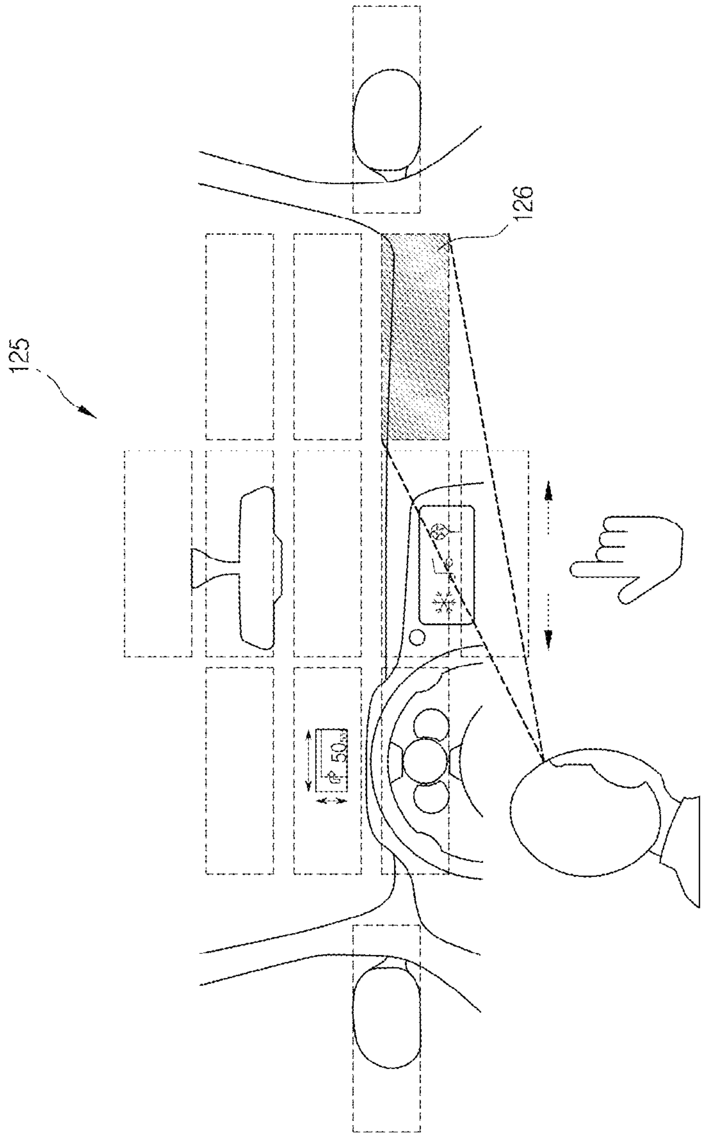

Referring to FIG. 16, among the control target regions 125, the control target corresponding to the ROI 126 to which the driver's gaze is directed may be an infotainment display in front of a passenger seat, and the infotainment display in front of the passenger seat may be controlled according to a command corresponding to the identified gesture.

As described above, the movement identification device 50 according to the disclosed embodiment may easily control various devices of a vehicle by means of a gesture in combination with tracking of a driver's gaze through the indoor camera 100. In addition, the cost of using a high-performance single controller may be lowered by distributed operation between the first controller 200, which an indoor camera controller, and the second controller 300, which is a radar controller. In addition, a time of executing an operation may be reduced by reducing the operation complexity of an azimuth-elevation steering matrix.

In accordance with one aspect of the present disclosure, a movement identification device and movement identification method for controlling a control target according to an identified gesture can be provided.

Thus, various devices of a vehicle can be easily controlled through a gesture in combination with tracking of a driver's gaze through an indoor camera.

The cost of using a single high-performance controller can be reduced by distributing operations between an indoor camera controller and a radar controller.

In addition, a time of executing an operation can be reduced by reducing the operation complexity of an azimuth-elevation steering matrix.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A gesture identification apparatus comprising:

an indoor camera configured to have a field of view inside a vehicle and obtain image data;

an indoor radar configured to have a sensing area inside the vehicle and obtain radar data; and a controller including a first processor and a second processor, the first processor configured to process gesture image data of a driver obtained from the indoor camera to obtain location information of a region including the driver's hand, and the second processor configured to process the location information and gesture radar data of the driver obtained from the indoor radar to identify the driver's gesture, wherein the controller is configured to:

determine a region of interest (ROI), to which a driver's gaze is directed, among a plurality of predetermined control target regions inside the vehicle from the image data of the driver obtained from the indoor camera; and transmit a command corresponding to the identified gesture to a control target corresponding to the ROI.

2. The gesture identification apparatus of claim 1, wherein the controller is configured to extract a feature vector including information on a distance, a velocity, and an angle of arrival of the gesture based on performing digital signal processing on the location information and the gesture radar data.

3. The gesture identification apparatus of claim 2, wherein the controller is configured to convert the location information to location information of a μ-v coordinate system.

4. The gesture identification apparatus of claim 3, wherein the controller is configured to calculate an azimuth-elevation steering matrix based on the converted location information.

5. The gesture identification apparatus of claim 2, wherein the controller is configured to:

perform a fast Fourier transform (FFT) on the gesture radar data and calculate a spatial covariance matrix based on the data on which the FFT is performed.

6. The gesture identification apparatus of claim 5, wherein the controller is configured to calculate a minimum variance distortionless response (MVDR) angle spectrum based on the spatial covariance matrix and an azimuth-elevation steering matrix.

7. The gesture identification apparatus of claim 6, wherein the controller is configured to extract a feature vector including the information on the distance, the velocity, and the angle of arrival of the gesture based on performing a constant false alarm rate (CFAR) on the calculated MVDR angle spectrum.

8. The gesture identification apparatus of claim 1, wherein the controller is configured to determine a control target corresponding to the ROI and to transmit the command corresponding to the identified gesture to the control target.

9. The gesture identification apparatus of claim 1, wherein, based on identifying a command, which matches the command corresponding to the identified gesture, among pre-stored commands for the control target corresponding to the ROI, the controller is configured to transmit the matched command to the control target.

10. The gesture identification apparatus of claim 1, wherein, based on failing to identify a command, which matches the command corresponding to the identified gesture, among pre-stored commands for the control target corresponding to the ROI, the controller is configured to notify the driver that the gesture is unidentifiable.

11. A method comprising:

obtaining, by an indoor camera, gesture image data of a driver;

obtaining, by an indoor radar, gesture radar data of the driver;

obtaining, by at least one processor processing the gesture image data, location information of a region including a driver's hand;

identifying, by the at least one processor processing the location information and the gesture radar data, a driver's gesture;

determining, by the at least one processor, a ROI, to which a driver's gaze is directed, among a plurality of predetermined control target regions inside a vehicle from the image data of the driver obtained from the indoor camera; and transmitting, by the at least one processor, a command corresponding to the identified gesture to a control target corresponding to the ROI.

12. The method of claim 11, wherein the identifying of the gesture of the driver comprises extracting a feature vector including information on a distance, a velocity, and an angle of arrival of the gesture based on performing digital signal processing on the location information and the gesture radar data.

13. The method of claim 12, wherein the extracting of the feature vector comprises converting the location information to location information of a μ-v coordinate system.

14. The method of claim 13, wherein the extracting of the feature vector comprises calculating an azimuth-elevation steering matrix based on the converted location information.

15. The method of claim 12, wherein the extracting of the feature vector comprises:

performing a fast Fourier transform (FFT) on the gesture radar data; and calculating a spatial covariance matrix based on the data on which the FFT is performed.

16. The method of claim 15, wherein the extracting of the feature vector comprises calculating a minimum variance distortionless response (MVDR) angle spectrum based on the spatial covariance matrix and an azimuth-elevation steering matrix.

17. The method of claim 16, wherein the extracting of the feature vector comprises extracting a feature vector including the information on the distance, the velocity, and the angle of arrival of the gesture based on performing a constant false alarm rate (CFAR) on the calculated MVDR angle spectrum.

18. The method of claim 11, further comprising determining a control target corresponding a ROI based on the ROI being determined.

19. The method of claim 11, wherein the transmitting to the control target comprises transmitting a matched command to the control target based on identifying the matched command, which matches the command corresponding to the identified gesture, among pre-stored commands for the control target corresponding to the ROI.

20. The method of claim 11, further comprising notifying the driver that the gesture is unidentifiable based on failing to identify a command, which matches the command corresponding to the identified gesture, among pre-stored commands for the control target corresponding to the ROI.

* * * * *